(12) United States Patent
Shaw

(10) Patent No.: US 8,746,352 B2
(45) Date of Patent: Jun. 10, 2014

(54) PRESSURE ENERGIZED INTERFERENCE FIT SEAL

(75) Inventor: Michael Shaw, Aberdeen (GB)

(73) Assignee: Vetco Gray Inc., Houston, TX (US)

( * ) Notice: Subject to any disclaimer, the term of this patent is extended or adjusted under 35 U.S.C. 154(b) by 115 days.

(21) Appl. No.: 13/107,672

(22) Filed: May 13, 2011

(65) Prior Publication Data

US 2012/0285676 A1 Nov. 15, 2012

(51) Int. Cl.
*E21B 33/02* (2006.01)

(52) U.S. Cl.
USPC ........... 166/368; 166/85.3; 166/387; 277/339

(58) Field of Classification Search
USPC ........ 166/387, 85.3, 368, 189, 141, 179, 192, 166/195, 196; 277/337, 339, 342, 531
See application file for complete search history.

(56) References Cited

U.S. PATENT DOCUMENTS

| | | | | |
|---|---|---|---|---|
| 2,876,708 A | * | 3/1959 | Frost | 166/106 |
| 3,447,837 A | * | 6/1969 | Deli et al. | 305/104 |
| 3,655,206 A | * | 4/1972 | Adams | 277/396 |
| 4,411,436 A | | 10/1983 | Durenec | |
| 5,013,187 A | * | 5/1991 | MacIntyre et al. | 405/169 |
| 2005/0242519 A1 | * | 11/2005 | Koleilat et al. | 277/434 |
| 2008/0233838 A1 | * | 9/2008 | Mase et al. | 451/38 |

* cited by examiner

*Primary Examiner* — Giovanna Wright
*Assistant Examiner* — Ronald Runyan
(74) *Attorney, Agent, or Firm* — Bracewell & Giuliani LLP

(57) ABSTRACT

A seal assembly for use between wellbore tubulars employs an inner seal ring partially circumscribed by an outer seal ring. The seal rings are axially slidable with respect to one another and can be made from pliable inelastic materials such as graphite or a fluoropolymer. The seal rings contact one another along profiled surfaces that are angled such that by axially urging the seal rings towards one another produces a bulge in the seal assembly directed radially outwards and inwards. The bulging seal rings come into contact with opposing sides of the wellbore tubulars to define a sealing surface. Axial supports at opposing lateral ends of the seal rings maintain the seal between the tubulars.

18 Claims, 4 Drawing Sheets

PRESSURE ENERGIZED INTERFERENCE FIT SEAL

FIELD OF THE INVENTION

This invention relates in general to production of oil and gas wells, and in particular to a seal assembly for use between wellbore tubulars.

DESCRIPTION OF RELATED ART

Wellheads used in the production of hydrocarbons extracted from subterranean formations typically comprise a wellhead assembly attached at the upper end of a wellbore formed into a hydrocarbon producing formation. Wellhead assemblies usually provide support hangers for suspending production tubing and casing into the wellbore. The casing lines the wellbore, thereby isolating the wellbore from the surrounding formation. The tubing typically lies concentric within the casing and provides a conduit therein for producing the hydrocarbons entrained within the formation.

Wellhead assemblies also typically include a wellhead housing adjacent where the casing and tubing enter the wellbore, and a production tree atop the wellhead housing. The production tree is commonly used to control and distribute the fluids produced from the wellbore and selectively provide fluid communication or access to the tubing, casing, and/or annuluses between the tubing and casing. Valves assemblies are typically provided within wellhead production trees for controlling fluid flow across a wellhead, such as production flow from the borehole or circulating fluid flow in and out of a wellhead.

Seals are used between inner and outer wellhead tubular members to contain internal well pressure. The inner wellhead member may be a tubing hanger that supports a string of tubing extending into the well for the flow of production fluid. The tubing hanger lands in an outer wellhead member, which may be a wellhead housing, a Christmas tree, or a tubing head. A packoff or seal seals between the tubing hanger and the outer wellhead member. Alternately, the inner wellhead member might be an isolation sleeve secured to a Christmas tree. A seal or packoff seals between the isolation sleeve and a casing hanger located within the wellhead housing.

A variety of seals of this nature have been employed in the prior art. Prior art seals include elastomeric and partially metal and elastomeric rings. Prior art seal rings made entirely of metal for forming metal-to-metal seals are also employed. The seals may be set by a running tool, or they may be set in response to the weight of the string of casing or tubing. One type of prior art metal-to-metal seal has inner and outer walls separated by a conical slot. An energizing ring is pushed into the slot to deform the inner and outer walls apart into sealing engagement with the inner and outer wellhead members. The deformation of the inner and outer walls exceeds the yield strength of the material of the seal ring, making the deformation permanent.

Because elastomers can degrade when subjected to increased operating temperatures, seals that include elastomeric material may necessarily have a truncated life. Also, material properties of elastomers vary more than materials with less elasticity, thereby limiting the temperature ranges in which elastomeric seals may be employed. Elastomeric materials are also prone to fracture when subjected to rapid gas decompression and may swell or degrade when exposed to certain chemicals. Metal to metal seals also have a shortcoming in that the forces required for setting or energizing the seal may be difficult to generate in some wells, such as those subsea.

SUMMARY OF THE INVENTION

Disclosed herein is an example of a seal assembly for use between wellbore tubulars. In an example embodiment, the seal assembly includes an inner seal ring partially circumscribed by an outer seal ring. The inner and outer seal rings having opposing surfaces that are profiled oblique to an axis of the tubulars. The outer seal ring inner radial surface is in sliding contact with the inner seal ring outer radial surface. When the seal assembly is set between the tubulars and opposing axial forces are applied to lateral ends of the outer seal ring and inner seal ring, the inner and outer seal rings slide against each other and are pushed radially away from one another. The inner radius of the seal assembly contacts an inner tubular and an outer radius of the seal assembly contacts an outer tubular and sealing surfaces form where the seal assembly contacts the tubulars. A spring assembly can be included that applies an axial force on one of the lateral ends of the outer seal ring or inner seal ring. The spring assembly can be a resilient member, such as a Belleville washer, a stack of Belleville washers, wave spring washers, coiled springs or combinations thereof. In an example embodiment, the inner and outer seal rings can be inelastic and include substances such as graphite, a fluoropolymer, or combinations thereof. In an example embodiment, lateral rings can be provided on distal surfaces of the inner ring and outer ring. In an example embodiment, an intermediate ring is disposed between at least a portion of the inner radial surface of the outer ring and the outer radial surface of the inner ring. The intermediate ring can have a hardness greater than a hardness of the inner and outer rings. In an example embodiment, the intermediate ring is a coating on each of the inner radial surface of the outer ring and the outer radial surface of the inner ring.

Also disclosed herein is a wellhead assembly. In an example embodiment the wellhead assembly is made up of an outer tubular, an inner tubular inserted within the outer tubular, an annular space defined between the inner and outer tubulars, a seal assembly in the annular space and between axial supports coupled with at least one of the inner or outer tubular. The seal assembly includes an inner seal ring having an inner radial surface in selective contact with a portion of a outer radial surface of the inner tubular. Also included with the seal assembly is an outer radial surface profiled at an angle oblique to an axis of the wellhead assembly and an outer seal ring having an outer radial surface in selective contact with a portion of an inner radial surface of the outer tubular and an inner radial surface profiled at an angle oblique to an axis of the wellhead assembly. The profile of the inner radial surface of the outer seal ring corresponds to the outer radial surface of the inner seal ring, so that when the inner tubular is inserted into the outer tubular and axial forces are applied to the seal assembly by the supports, the inner and outer seal rings slide into respective positions. The sliding action of the inner and outer rings forms sealing interfaces between the inner radius of the inner ring and a portion of an outer radius of the inner tubular and between the outer radius of the outer ring and a portion of an inner radius of the outer tubular. In an example embodiment, at least one of the supports is a resilient member. In an example embodiment, the wellhead assembly further includes a groove formed in the outer radius of the inner tubular, wherein the seal assembly is disposed in the groove and upper and lower edges of the groove comprise supports for the seal assembly. In an example embodiment, the inner and outer seal rings each include a compliant material, so that when the axial forces are applied to distal ends of the inner and outer seal rings, the inner radius of the inner seal ring bulges radially inward to form the sealing interface with the inner tubular and the outer radius of the outer seal ring bulges radially outward to form the sealing interface with the outer tubular. In an example embodiment, the inner and outer tubulars are wellbore casing and production tubing.

Also included is a method of sealing an annular space between wellbore tubulars. In an example embodiment the method includes providing a seal assembly that includes an inner seal ring with an outer radial surface profiled oblique to an axis of the wellbore tubulars, and an outer seal ring having an inner radial surface profiled oblique to the axis of the wellbore tubulars and in sliding contact with the inner seal ring outer radial surface. The seal assembly is set between the wellbore tubulars and an axial length of the seal assembly is maintained by applying axial loads to opposing lateral ends of the seal assembly. The applied axial loads bulge out at least one of an inner radial surface on the inner seal ring and an outer radial surface of the outer seal ring to form a sealing surface between the seal assembly and at least one of the tubulars. In an example embodiment, prior to disposing the seal assembly between the tubulars, the seal assembly width exceeds a width of a space between the wellbore tubulars, and as the tubulars are set in place the inner and outer seal rings axially slide a designated distance in opposite directions along the inner and outer radial profiles. In an example embodiment, the designated distance is defined by the position of where the axial loads are applied to the seal assembly. In an example embodiment, the inner and outer seal rings include an inelastic substance that can be graphite, a fluoropolymer, or combinations thereof. In an example embodiment, the wellbore tubulars are inner and outer wellbore tubulars, and a groove is formed on an outer radial surface of the inner wellbore tubular, and wherein the seal assembly is provided in the groove.

DETAILED DESCRIPTION OF THE INVENTION

Figure 1:
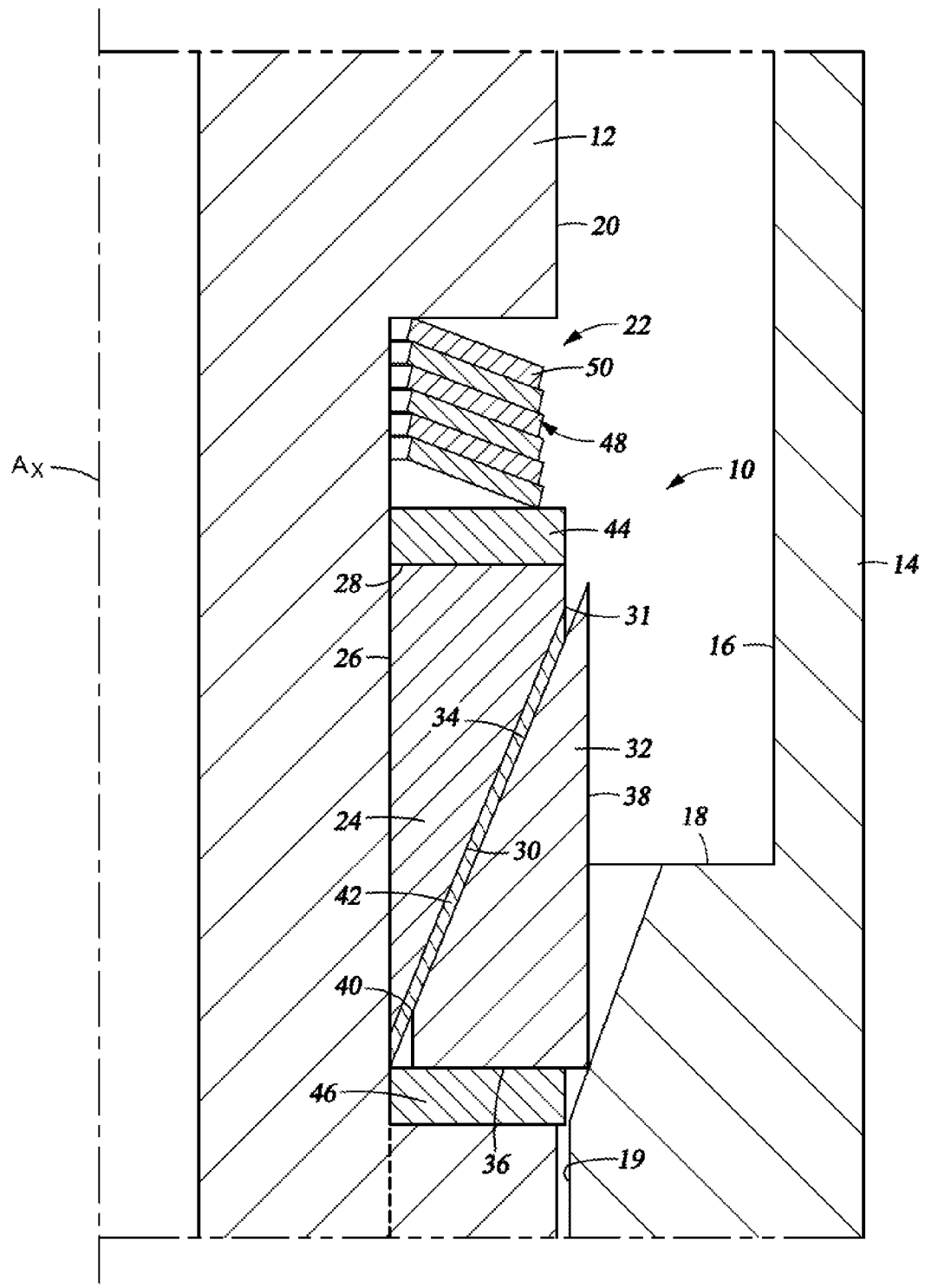
FIG. 1 is a side partial sectional view of an example embodiment of an un-energized seal for use with wellbore tubulars in accordance with the present invention.

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

FIG. 1 illustrates one example embodiment of a seal assembly 10 between inner and outer tubulars 12, 14 and shown in a side sectional view. In the example of FIG. 1, tubular 12 can be respectively a hanger for a tubular or an isolation sleeve, whereas tubular 14 can be a hanger for a tubular or a production tree. The tubulars 12, 14 may be included within a wellhead assembly and also may be disposed within a wellbore. The configuration of the seal assembly 10 of FIG. 1 is in an unenergized state and thus not providing a sealing function between the respective tubulars 12, 14. FIG. 1, in an example embodiment, illustrates a step of assembling a wellhead assembly where the respective inner and outer tubulars 12, 14 are not in their assembled positions. As shown, the seal assembly 10 is disposed at a location along an axis $A_X$ of the tubulars 12, 14 adjacent a portion of the outer tubular 14 and with the inner radius 16 of the outer tubular 14 extending radially outward from a shoulder 18 to define an enlarged annular space therebetween. The shoulder 18 of FIG. 1 is shown formed where the radius of the outer tubular 14 changes abruptly and then slopes radially inward and transitions to an inner radius 19 closer to the axis $A_X$ than inner radius 16. In an example embodiment and for purposes of reference, the inner radius 19 is below the shoulder 18.

Still referring to FIG. 1, the outer radius 20 of the inner tubular 12 is shown having a groove 22 formed along a portion of its length and its entire periphery. It is within the groove 22 where the seal assembly 10 is supported. The seal assembly 10 is shown having an inner seal ring 24 set within the groove 22, so that an inner radius 26 of the inner seal ring 24 rests along the inner surface of the groove 22. Optionally, a slight interference fit may exist between the inner seal ring 24 and inner surface of the groove 22. A lateral surface 28 of the inner ring 24 projects radially outward from the inner radius 26 and terminates at an outer radius of the inner seal ring 24. The seal ring 24 has an outer radial surface 30 that is profiled to extend along a plane that when viewed in cross-section is generally oblique to the axis $A_X$. More specifically, the radial thickness of the seal ring 24, which is affected by the profile of the outer radial surface 30, increases proximate to the lateral surface 28. In the embodiment of FIG. 1, the outer radial surface 30 intersects the inner radius 26 and extends obliquely and radially up to a transition 31. The remaining portion of the outer radial surface 30, up to the lateral surface 28, extends along a plane generally parallel with the axis $A_X$.

An outer seal ring 32 is shown circumscribing a substantial portion of the inner seal ring 24. The outer seal ring 32 includes an inner radial surface 34 that has a profile corresponding to the profile of the outer radial surface 30 of the inner seal ring 24. As such, the inner and outer seal rings 24, 32 may slide in an axial direction along the surfaces 30, 34 with respect to one another when disposed in the configuration of FIG. 1. An example embodiment exists where the angle at the intersection of the inner ring inner radius 26 and inner ring outer radial surface 30 is at least 22°. Similarly, an example embodiment exists where the angle at the intersection of the outer ring outer radial surface 38 and outer ring inner radial surface 34 is at least 22°. The outer seal ring 32 includes a lateral surface 36 shown largely perpendicular to the axis $A_X$ and distal from the lateral surface 28 of the inner seal ring 24. The outer seal ring 32 also includes an outer radial surface 38 shown distal from the inner radius 26 of the inner ring 24 and substantially aligned with the axis $A_X$. Also in this configuration, the thickness or width of a cross-section of the seal assembly 10 is greater than the depth of the groove 22 so that the outer radial surface 38 contacts the shoulder 18 above the inner radius 19. Similar to the transition 31 on the inner seal ring 24, a transition 40 is shown provided on the inner radial surface 34 of the outer seal 32 and defines a location where the surface 34 changes from an obliquely angled surface to one that is largely parallel with the axis $A_X$. By virtue of the transitions 31, 40 each of the inner and outer seal rings 24, 32 thereby proximate a rectangular section combined with a triangular section. However, embodiments exist wherein neither of the inner or outer seal rings 24, 32 include a transition and thus have a substantially triangular cross-sectional configuration.

An optional intermediate ring 42 is illustrated in the embodiment of the seal assembly 10 of FIG. 1 and shown provided on the contact surface between the inner and outer seal rings 24, 32. In one example embodiment, the intermediate ring 42 is a separate member that coaxially inserts between the inner and outer seal rings 24, 32. Optionally, one or both of the inner or outer seal rings 24, 32 may have an applied coating on their respective inner and outer radial surfaces 26, 34 that make up the intermediate ring 42. Example materials for the inner and outer seal rings 24, 32 include materials that are pliable. Embodiments also exist wherein the rings 24, 32 are formed from an inelastic material, thereby avoiding problems with the prior art of degradation due to prolonged exposure to high temperatures. Specific material examples for the inner and outer seal rings 24, 32 include graphite, compression molded graphite, fluoropolymers, including polytetrafluoroethylene and other fluoro carbon solids.

Optional lateral rings 44, 46 are shown disposed on the lateral surfaces 28, 36 respectively of the inner and outer seal rings 24, 32. The lateral rings 44, 46, also referred to as anti-extrusion rings, can support the lateral ends of the seal rings 24, 32 and prevent the material of the seal rings 24, 32 from extruding out when subjected to axial or radial loads. Example materials of the lateral rings 44,46 include polymer thermoplastics such as polyetheretherketone; but may as specific applications vary. A spring assembly 48 is shown in the example embodiment of FIG. 1 and set on a side of the lateral ring 44 opposite its boundary with the inner ring lateral surface 28. In the example of FIG. 1, the spring assembly 48 which can be any resilient member, is made up of a series of stacked Belleville washers 50 in a relaxed or unflexed state. Further, the lateral ring 46 is sandwiched between the lower end of the groove 22 and outer seal ring lateral surface 36. Because the inner and outer seal rings 24, 32 may slide with respect to one another along their radial surfaces 30, 34 the axial length (or height) of the distance between the opposing lateral surfaces 28, 36 may vary as the inner and outer seal rings 24, 32 slide on one another. In the unenergized configuration of FIG. 1, the distance between the lateral surfaces 28, 36 is such that the spring assembly 48 may be in a relaxed state thereby occupying more space than in an unrelaxed state.

Figure 2:
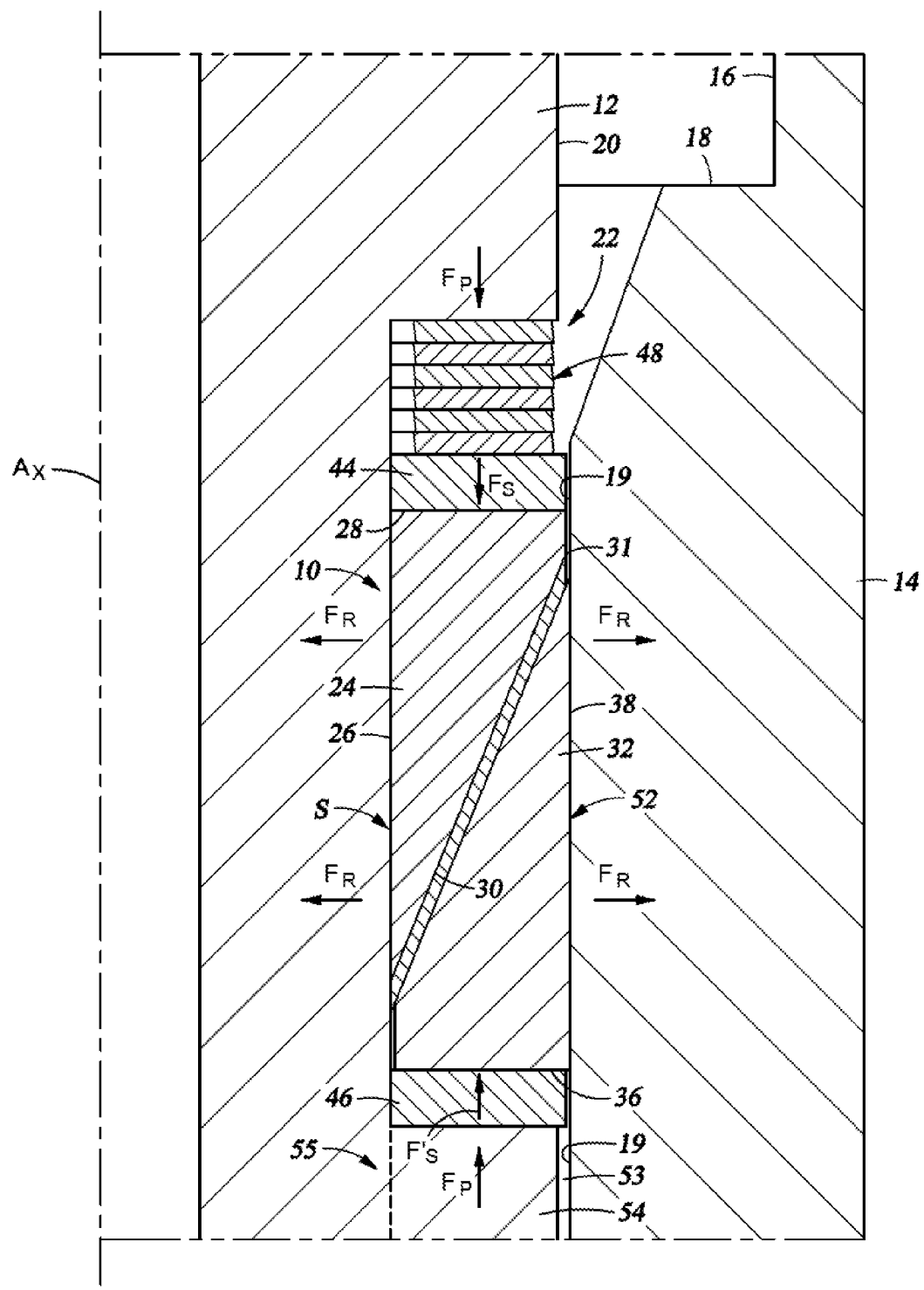
FIG. 2 is a side sectional view of an example embodiment of the seal of FIG. 1 in an energized configuration in accordance with the present invention.

Referring now to FIG. 2, inner tubular 12 and seal assembly 10 have been axially moved so that the inner radius 19 is adjacent the outer radial surface 38 of the outer seal ring 32. Because the inner radius 19 of the outer tubular 14 now occupies space occupied by a portion of the outer seal 32 of FIG. 1, by reconfiguring the components as shown in FIG. 2, the outer seal ring 32 is forced radially inward that in turn generates a resultant axial force to urge the inner seal ring 24 in a direction away from the lateral surface 36 of the lower seal ring and towards the spring assembly 48. The dimensions of the groove 22 of FIG. 2 are such that the axial movement of the inner seal ring 32 compresses the spring assembly 48 thereby in turn generating a spring force $F_S$ that transfers through the lateral ring 44 and into the inner and outer seal rings 24, 32. A counter spring force $F'_S$ is generated from the lateral ring 46 in a direction opposite spring force $F_S$. As these opposingly directed axial forces exert a compressive force against the seal rings 24, 32 thereby creating a radial bulge that produces contact between the inner radius 26 of the inner seal ring 24 and the inner radial wall of the groove 22. Similarly, there are radial bulges created on the outer radial surface 38 of the outer seal ring 32 thereby urging the outer seal ring 32 into contact with the inner radius 19 of the outer tubular 14. The spring force $F_S$ ($F'_S$) exerted into the seal assembly 10 produces sufficient sealing to prevent leakage across the seal assembly 10 at low differential pressures across the axis of the seal assembly 10. A sealing surface 52 is defined between the outer seal ring 32 and outer tubular; and a sealing surface S is formed between the inner seal ring 24 and inner radial wall of the gap 22.

Still referring to FIG. 2, a gap 53 is shown between the inner radius 19 of the outer tubular 14 and outer radial 20 of the inner tubular 12. Within the gap 53, fluid pressure may communicate onto the seal assembly 10 and generate a resultant force $F_P$ shown in a generally axial orientation and directed from the lateral ring 46 against the lateral surface 36 thereby urging the outer seal ring 32 against the inner seal ring 24. In example embodiments where the inner and outer seal rings 24, 32 are generally pliable elements, the inner and outer seal rings 24, 32 are able to axially slide with respect to one another. The force $F_P$ produces resultant forces $F_R$ shown directed radially outward from the outer seal ring 34 against the outer tubular 14 and radially inward from the inner radial surface 26 of the inner seal ring 24 against the inner tubular 12. As such, by an increase in pressure from a wellbore (not shown) as communicated to the gap 53, the sealing forces increase with increasing wellbore pressure. Similarly, in the event of a pressure in the region adjacent the spring assembly 48 that exceeds that in the gap 53, a resulting force $F_P$ exerted on the lateral surface 28 of the inner seal ring 24 also may generate resultant forces $F_R$ that increases the magnitude of the pressure seal of the seal assembly 10.

Optionally, the lower end of the groove 22 can be a support ring 54 mounted to the inner tubular 12 along a connection 55. Where the connection 55 can be a threaded connection, a weld, a press or interference fit, or other attachment means. In an example of installing the seal assembly 10 between the tubulars 12, 14, components of the seal assembly 10 are set onto the inner tubular 12 prior to adding the support ring 54. More specifically, the components of the seal assembly 10 can be slid onto the inner tubular 12 in the following order (1) the spring assembly 48, (2) lateral ring 44, (3) inner seal ring 24, (4) intermediate ring 42 (in embodiments having the intermediate ring 42 separate from the seal rings 24, 32), (5)

outer seal ring 32, lateral ring 46. When the components of the seal assembly 10 are put on the inner tubular 12, the support ring 54 can then be mounted thereby axially supporting the seal assembly 10. In optional embodiments when the spring assembly 48 is a coil spring, a stiffener ring (not shown) may be included for distributing the spring load. With the seal assembly 10 and support ring 54 in place, the inner tubular 12 can be inserted within the outer tubular 14.

Figure 2A:
FIG. 2A is a side perspective view of an example of a spring assembly.
Figure 3:
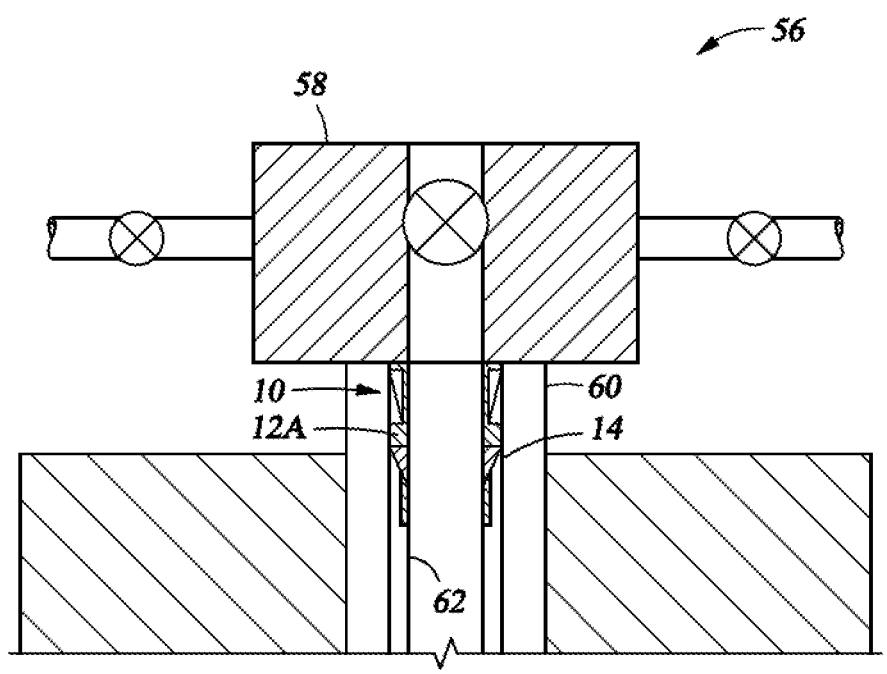
FIG. 3 is a side sectional view of an example embodiment of a wellhead assembly having a seal in an assembled configuration in accordance with the present invention.

In one example embodiment of the seal assembly 10 used in a wellhead assembly 56 is shown in a side sectional view in FIG. 3. In this example, the wellhead assembly 56 includes a production tree 58 mounted on wellhead housing 60 and where the inner tubular 12A is a tubing hangar and having a string of tubing 62 depending from its lower end. As such, the seal assembly 10 is provided in an outer radial slot formed on the outer circumference of a portion of the tubing hangar 12A. In an optional embodiment, the spring assembly 48A is shown in a side perspective view in FIG. 2A. In this example embodiment, the spring assembly 48A is a wave washer that may be a single member as illustrated in FIG. 2A or may be made up of a stack of individual wave washers and set in combination with the seal assembly 10.

One of the advantages of using the profiled inner and outer seal rings as disclosed herein is the low friction between these two members thereby providing for an assembly that can be quickly and easily formed. Moreover, the inelastic material of the rings allows for the rings to move easily relative to one another and as such further maximizing the radial load generated with relative axial movement of the inner and outer seal rings 24, 32. Rings formed from the inelastic material will not coalesce like other parts that may be highly compressed over time and at elevated temperatures. Further simplicity is realized with the present example in that it relies on variations in wellbore pressure to generate the sealing force required during these high pressure events. The materials also allows for operation at high temperatures such as in excess of 400° F. and also at cryogenic temperatures well below −20° F. The inelastic materials can mitigate seal failure from explosive decompression and allow rapid bleed down of annulus pressures, and also mitigate risk of material degradation or swelling due to chemical attack. The seal may be included with the tubular on which it is located or it can be set with a running tool. Although shown in the embodiments as being in a groove on an inner tubular, alternate embodiments exist wherein the seal assembly 10 can be between inner and outer respective radiuses of concentric tubulars and between supports coupled with one or two of the tubulars or can be an annular channel provided in an outer tubular.

An advantage of embodiments of the seal assembly disclosed herein is that this concept may be pressure energized by the inner and outer seal rings 24, 32 interfacing to act as a wedge. The seal assembly can thus have a low interface stress when set as this interface stress is only required to seal at low pressures thereby ensuring a pressure differential always exists across the seal. As pressure is increased, the wedge effect increases the interface stress and continues to maintain a seal. The low interface stress corresponds to a low setting load. On standard bulk seals (one part) the increase in interface stress with applied pressure is much less (relies on Poisson's effect)—meaning standard bulk seals require much larger interface stresses when set, which corresponds to much higher setting loads. Chevron packing sets which can be made from similar materials are pressure energized to some extent, but are not easily assembled into bi-direction configurations (can seal from either direction) and generally require very good surface finish (the larger interface stresses and contact area offered by the concept should make it more tolerant of minor surface defects).

Figure 4:
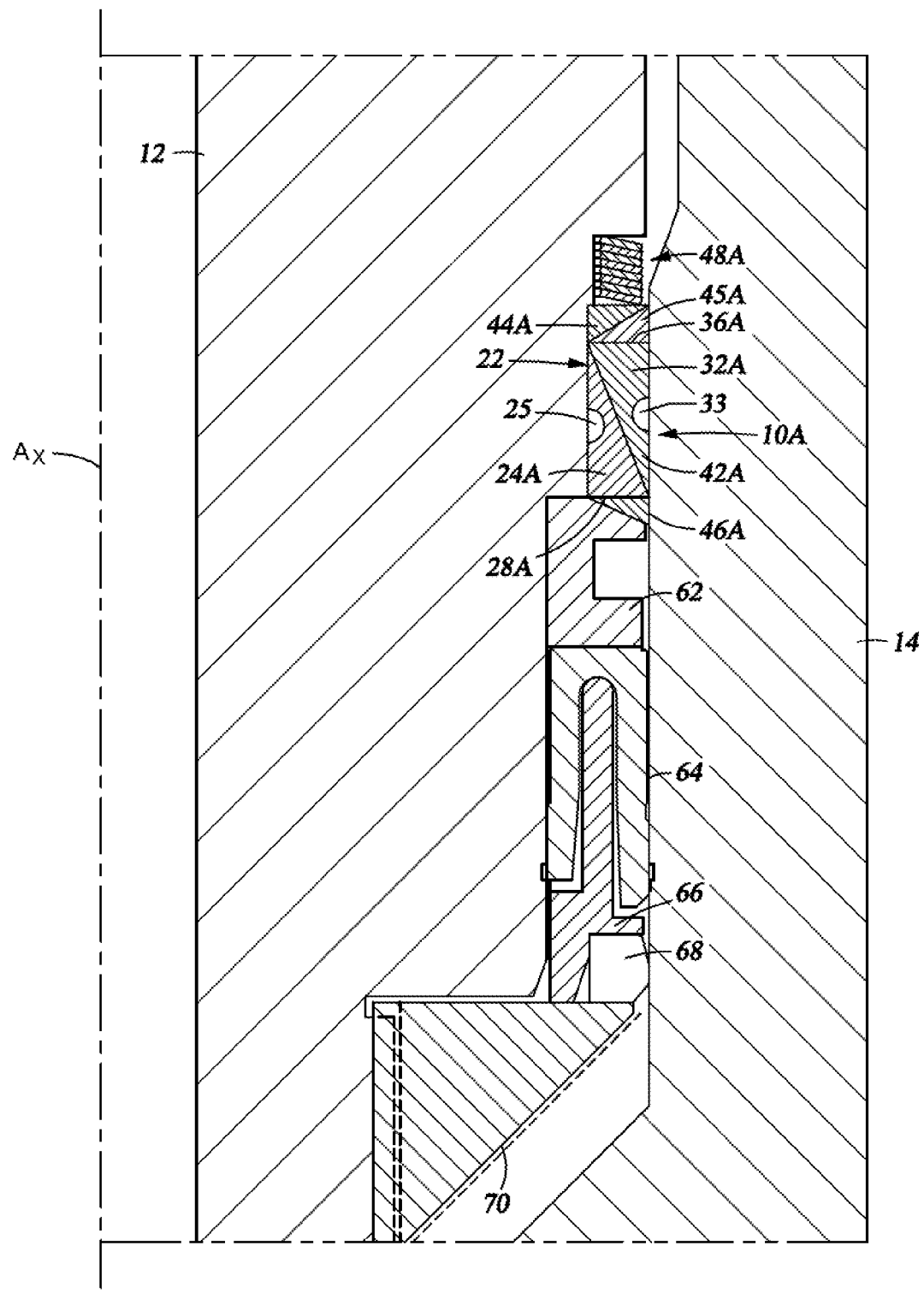
FIG. 4 is a side sectional view of an alternate embodiment of a wellhead assembly having a seal in an assembled configuration in accordance with the present invention.

Provided in a side sectional view in FIG. 4 is an alternate embodiment of a seal assembly 10A sealing the space between tubulars 12, 14. In this example embodiment, the lateral or anti-extrusion ring 44A is shown having a wedge or triangular shaped cross section with its inner radial surface largely parallel with the inner radius of the groove 22 and upper lateral surface substantially perpendicular with the inner radius of the groove 22. The outer radial surface of the anti-extrusion ring 44A is oblique to the axis AX and extends from the lower end of the inner radial surface of the anti-extrusion ring 44A to the outer radial end of the upper lateral surface of the anti-extrusion ring 44A. Combined with the anti-extrusion ring 44A is a wedge shaped anti-extrusion ring 45A having an oblique inner radial surface shown set against the oblique outer radial surface of the anti-extrusion ring 44A. The outer radial surface of the anti-extrusion ring 45A is substantially aligned with the axis AX, and its lower lateral surface is substantially normal to the axis AX. Also shown in FIG. 4, the lateral surface 36A of the outer seal ring 32A is adjacent the anti-extrusion ring 44A proximate the spring assembly 48A and the inner ring lateral surface 28A is proximate a lower anti-extrusion ring 46A distal from the spring assembly 48A. As such, the portion of the intermediate ring 42A adjacent the anti-extrusion ring 46A projects radially outward from the portion of the intermediate ring 42A adjacent the anti-extrusion ring 44A. The axial dimension or thickness of anti-extrusion rings 44A, 45A is much less than the axial dimension of inner and outer seal rings 24A, 32A, when assembled as shown in FIG. 4.

An inlay 25 is shown on the inner radial surface of the inner seal ring 24A having a semi-circular cross section. In an example embodiment the inlay 25 extends along the entire circumference of the inner radial surface of the inner seal ring 24A. In an example embodiment the inlay 25 includes a material have a lower value of hardness than that of the inner seal ring 24A. The inlay 25 may be continuous or split. An example embodiment includes the groove on the inner seal ring 24A but without the inlay 25. The outer seal ring 32A of FIG. 4 also includes an inlay 33 set in its outer radial surface. An example embodiment includes the groove on the inner seal ring 32A but without the inlay 33.

The anti-extrusion ring 46A of FIG. 4 also has a triangular or wedge shaped cross section wherein its upper lateral surface disposed adjacent the inner ring lateral surface 28A is substantially perpendicular with the axis AX and its outer radial surface facing the outer tubular 14 is substantially parallel with the axis AX. The lower lateral surface of the anti-extrusion ring 46A extends in an oblique direction from an inner end of the upper lateral surface to the outer to a lower end of the outer radial surface. A retainer ring 62 is shown circumscribing the inner tubular 12 on a side of the seal assembly 10A distal from the spring assembly 48A. In the example embodiment of FIG. 4, the retainer ring 62 has a "C" shaped cross section and is oriented so the end portions of the C face the outer tubular 14 to define an annular space between a mid portion of the retainer ring 62 and the outer tubular 14. A portion of a lateral side of the support ring 62 facing the seal assembly 10A is profiled along a line oblique to the axis AX, the slope of the line corresponds to the lower lateral side of the anti-extrusion ring 46A. The support ring 62 is supported on a metal seal 64 shown mounted over an energizing ring 66, both of which are also in the annular space between the inner and outer tubulars 12, 14. The metal seal 64 has an elongate inner leg contacting the inner tubular 12 and an elongate outer leg contacting the outer tubular 14. A mid portion of the metal seal 64 connects the inner and outer legs and has an upper lateral side set against the support ring 62. The energizing ring 66 has an elongate mid portion that inserts into the space between the inner and outer legs of the metal seal 64. A wiper ring 68 circumscribes the outer circumference of the energizing ring 66 on its lower end. A retainer ring 70 shown threadingly attached to the inner tubular 12 has a wedge shaped cross section with a generally planar upper surface, wherein the energizing ring 66 and wiper ring 68 are supported on the upper surface of the retainer ring.

While the invention has been shown or described in only some of its forms, it should be apparent to those skilled in the art that it is not so limited, but is susceptible to various changes without departing from the scope of the invention.

What is claimed is:

1. A seal assembly for use between wellbore tubulars comprising:
   an inner seal ring having an inner radial surface and an outer oblique surface profiled oblique to an axis of the tubulars and that intersects the inner radial surface;
   an outer seal ring having an inner oblique surface profiled oblique to the axis of the tubulars and in sliding contact with the inner seal ring outer oblique surface, so that when the seal assembly is set in an annular space between the tubulars and opposing axial forces are applied to ends of the outer seal ring and inner seal ring, sealing surfaces are formed where an inner radius of the seal assembly contacts an inner tubular and an outer radius of the seal assembly contacts an outer tubular;
   an anti-extrusion ring assembly on one of the ends of one of the seal rings, the anti-extrusion ring assembly comprising inner and outer members with mating oblique surfaces that slidingly engage each other such that an axial force causes a width of the anti-extrusion ring assembly to expand, the inner and outer members having a lesser axial dimension than an axial dimension of the inner and outer seal rings; and
   a spring assembly in engagement with an end of the anti-extrusion ring assembly opposite the seal rings for applying an axial force to the anti-extrusion ring assembly.

2. The seal assembly of claim 1, wherein the oblique surfaces of the inner and outer members are at a greater angle relative to the axis of the seal assembly than the oblique surfaces of the seal rings.

3. The seal assembly of claim 1, wherein the anti-extrusion ring assembly comprises an upper anti-extrusion ring assembly on an upper end of the seal rings and a lower anti-extrusion ring assembly on a lower end of the seal rings.

4. The seal assembly of claim 1, wherein the inner and outer seal rings include an inelastic substance comprising a material selected from the group consisting of graphite, a fluoropolymer, and combinations thereof.

5. The seal assembly of claim 1, wherein the inner and outer members of the anti-extrusion ring assembly are symmetrical with each other.

6. The seal assembly of claim 1, further comprising an intermediate ring disposed between at least a portion of the inner radial surface of the outer ring and the outer radial surface of the inner ring.

7. The seal assembly of claim 6, wherein the intermediate ring has a hardness greater than a hardness of the inner and outer rings.

8. The seal assembly of claim 6, wherein the intermediate ring comprises a coating on each of the inner radial surface of the outer ring and the outer radial surface of the inner ring.

9. A wellhead assembly comprising:
   an outer tubular;
   an inner tubular inserted within the outer tubular;
   an annular space defined between the inner and outer tubulars and a downward facing shoulder on the inner tubular member;
   an inner seal ring having an inner radial surface in selective contact with a portion of an outer radial surface of the inner tubular and an outer oblique surface profiled at an angle oblique to an axis of the wellhead assembly;
   an outer seal ring having an outer radial surface in selective contact with a portion of an inner radial surface of the outer tubular and an inner oblique surface profiled at an angle oblique to an axis of the wellhead assembly that intersects the outer radial surface and that corresponds to the outer oblique surface of the inner seal ring, so that when the inner tubular is inserted into the outer tubular and axial forces are applied to the inner and outer seal rings, the inner and outer seal rings slide into respective positions and a sealing interface is formed between the inner radius of the inner ring and a portion of an outer radius of the inner tubular and a sealing interface is formed between the outer radius of the outer ring and a portion of an inner radius of the outer tubular;
   a metal seal mounted in the annular space below the inner and outer seat rings, the metal seal having inner and outer legs separated by a slot;
   an energizing ring that inserts into the slot to force the inner and outer legs inward and outward into sealing engagement with the inner and outer tubulars, respectively;
   a retainer ring secured to the inner tubular member for forcing the energizing ring upward to apply an upward force to the metal seal; and
   wherein the metal seal and inner and outer seal rings are mounted in the annular space so that the upward force is transmitted through the inner and outer seal rings to the shoulder.

10. The wellhead assembly of claim 9, further comprising a spring located between the shoulder and the inner and outer seal rings.

11. The wellhead assembly of claim 9, further comprising a pair of anti-extrusion rings between the inner and outer seal rings and the shoulder, the anti-extrusion rings having mating oblique surfaces that slidingly engage each other, such that the upward force causes a width of the anti-extrusion rings to expand, and wherein an axial dimension of the anti-extrusion rings is less than an axial dimension of the inner and outer seal rings.

12. The wellhead assembly of claim 9, wherein the inner and outer seal rings are each comprised of a compliant material, so that when the axial forces are applied to distal ends of the inner and outer seal rings, the inner radius of the inner seal ring bulges radially inward to form the sealing interface with the inner tubular and the outer radius of the outer seal ring bulges radially outward to form the sealing interface with the outer tubular.

13. The wellhead assembly of claim 9, further comprising upper anti-extrusion rings between the inner and outer seal rings and the shoulder, and lower anti-extrusion rings between the metal seal and the inner and outer seal rings, the upper anti-extrusion rings having mating oblique surfaces that slidingly engage each other, and the lower anti-extrusion rings having mating oblique surfaces that slidingly engage each other, wherein the upward force causes a width of the lower and the upper anti-extrusion rings to expand.

14. A method of sealing an annular space between wellbore tubulars comprising:

providing a seal assembly comprising an inner seal ring having an inner radial surface and an outer oblique a surface profiled oblique to an axis of the wellbore tubulars that intersects the inner radial surface, and an outer seal ring having an inner oblique surface profiled oblique to the axis of the wellbore tubulars and in sliding contact with the inner seal ring outer radial surface;

providing an anti-extrusion ring assembly on one of the ends of one of the seal rings, the anti-extrusion ring assembly comprising inner and outer members with mating oblique surfaces that slidingly engage each other, the inner and outer members having at lesser axial dimension than an axial dimension of the inner and outer seal rings;

providing a spring assembly in engagement with an end of the anti-extrusion ring assembly opposite the seal rings for applying an axial force the anti-extrusion assembly;

(a) disposing the seal assembly, the anti-extrusion ring assembly, and the ring assembly between the wellbore tubulars; and (b) maintaining an axial length of the seal assembly by applying an axial load to an end of the seal assembly opposite the spring assembly, thereby bulging out at least one of an inner radial surface on the inner seal ring and an outer radial surface of the outer seal ring to form a sealing surface between the seal assembly and at least one of the tubulars and increasing a width of the anti-extrusion ring assembly.

15. The method of claim 14, wherein prior to step (b), a width of the seal assembly taken along a radius of the seal assembly exceeds a width of a space between the wellbore tubulars, wherein during step (b), the inner and outer seal rings axially slide a designated distance in opposite directions along the inner and outer radial profiles.

16. The method of claim 15, wherein the designated distance is defined by the position of where the axial loads are applied to the seal assembly.

17. The method of claim 14, wherein the inner and outer seal rings include an inelastic substance comprising a material selected from the group consisting of graphite, a fluoropolymer, and combinations thereof.

18. The method of claim 14, wherein the wellbore tubulars comprise inner and outer wellbore tubulars, and a groove is formed on an outer radial surface of the inner wellbore tubular, and wherein the seal assembly is provided in the groove.

* * * * *